March 17, 1942.   C. A. GUSTAFSON   2,276,573
EARTH MOVING APPARATUS
Filed Aug. 14, 1939    2 Sheets-Sheet 1
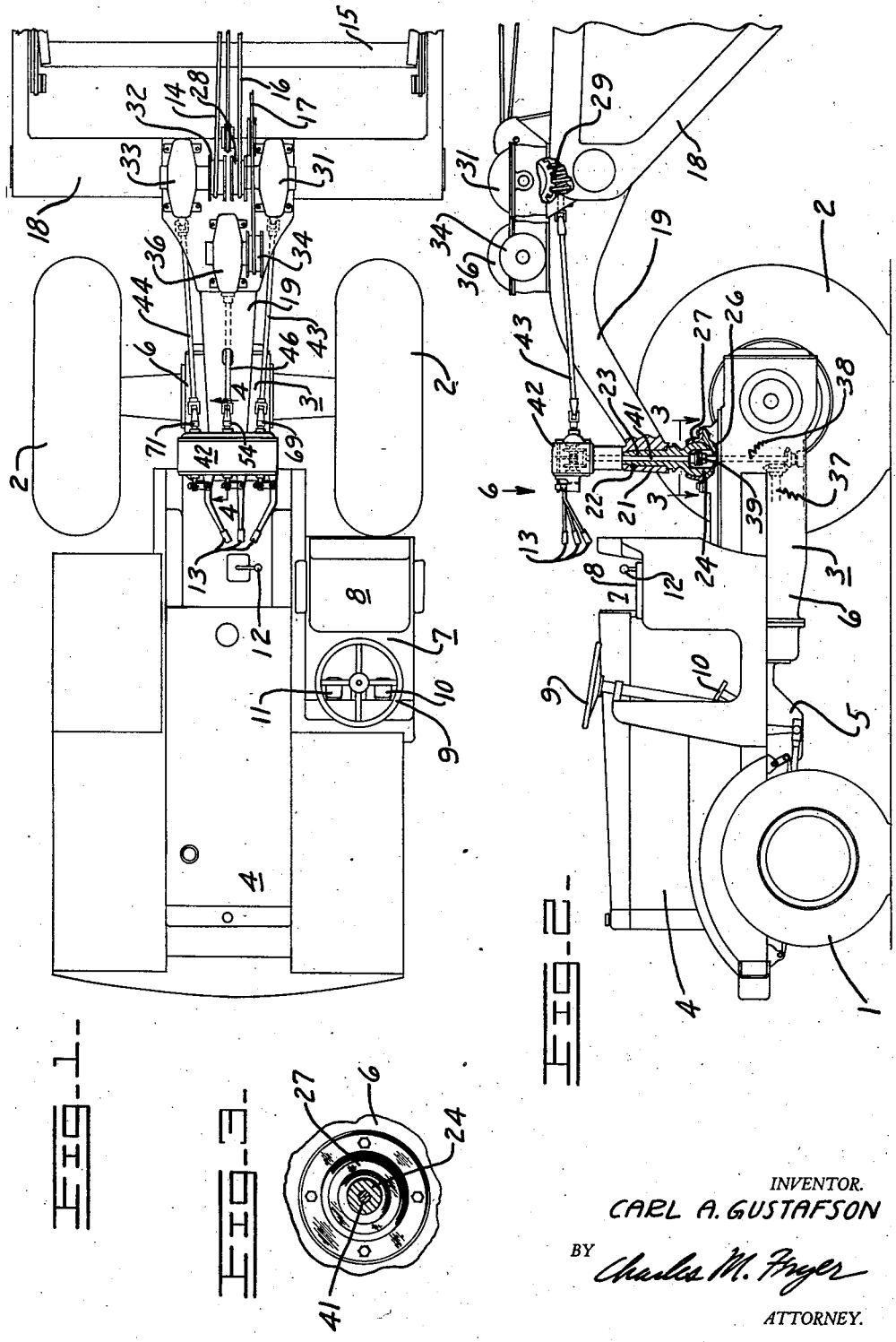
INVENTOR.
CARL A. GUSTAFSON
BY Charles M. Fryer
ATTORNEY.

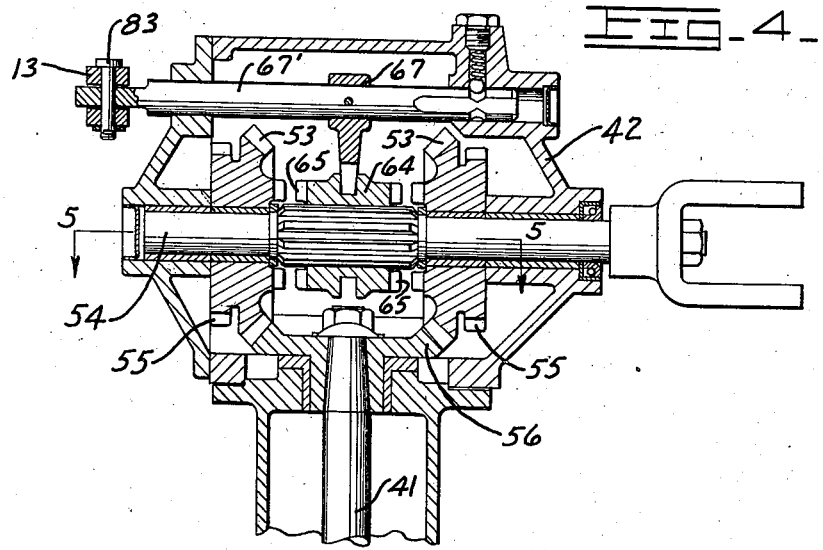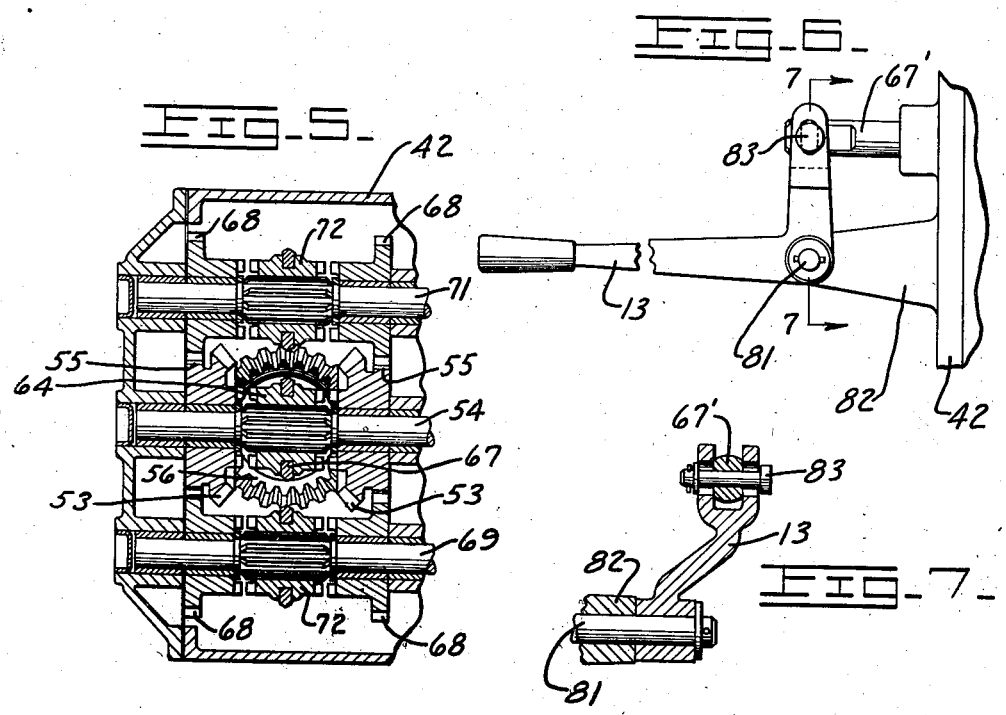

Patented Mar. 17, 1942

2,276,573

UNITED STATES PATENT OFFICE 2,276,573

EARTH MOVING APPARATUS

Carl A. Gustafson, Peoria, Ill., assignor to Caterpillar Tractor Co., San Leandro, Calif., a corporation of California Application August 14, 1939, Serial No. 289,997

7 Claims. (Cl. 37—124)

My invention relates to tractor propelled earth moving apparatus such as scrapers, and more particularly to an arrangement of control mechanism for a tractor propelled scraper or the like, and to a special type of tractor adapted for propelling the scraper.

There are generally two types of control mechanisms for tractor propelled scrapers now on the market, namely, hydraulic controls, and cable controls. With respect to cable control mechanism, it is customary to mount on the tractor which usually draws or pulls the scraper, power driven winding drums for operating the cables which control the scraper. Such arrangement has the disadvantage of causing a pull to be transmitted to the cables when the tractor is drawing the scraper; particularly when the tractor is turning, or travelling over hilly ground, and consequently has an arcuate movement relative to the scraper. Frequently, substantially the entire pull is transmitted through the cables instead of through the tractor drawbar. This results in undue strain on the cables, causing the cables to snap and thereby create costly tie-up of the apparatus, and the expense of new cables.

This invention is designed to overcome such difficulty and has as its objects, among others, the provision of control and driving mechanism for a scraper which are of such character as not to cause stress to be transmitted thereto as a result of propulsion of the tractor, and of a tractor design particularly adapted for scraper operation and which is of comparatively economical and simple construction. Other objects of the invention will become apparent from a perusal of the following description thereof.

In general, the arrangement of this invention comprises mounting directly on the scraper, cable winding drums or equivalent mechanism to which cables or equivalent mechanism are connected for transmitting drives to manipulatable scraper mechanism on the scraper, and driving such drums through shafting which is driven by the tractor. The connection of such shafting is of such character as to impart substantially no stress thereto as a result of tractor propulsion irrespective of the relative position between the tractor and the scraper; and since the winding drums are mounted on the scraper, they will have substantially no stress imparted thereto as a result of tractor propulsion. The tractor is preferably a wheel tractor having inflated rubber tires to enable relatively high speed transportation of the load, for purposes of economy. An operator's station is positioned at one side of the tractor; and scraper control mechanism is so located with respect to the operator's station as to facilitate the work of the operator in controlling the tractor, as well as the scraper mechanism. Reference is now made to the drawings for a more detailed description of the invention.

Fig. 1 is a more or less schematic plan view of the apparatus; the major portion of the scraper being omitted from the view, inasmuch as the particular construction of the scraper forms no part of the invention.

Fig. 2 is a side elevation of the structure shown in Fig. 1, with parts of the structure broken away and parts shown in section to disclose more clearly the construction.

Fig. 3 is a section taken in a plane indicated by line 3—3 in Fig. 2.

Fig. 4 is a section of part of scraper power control mechanism, taken in a plane indicated by line 4—4 in Fig. 1.

Fig. 5 is a horizontal section taken in the plane indicated by line 5—5 in Fig. 4.

Fig. 6 is a plan view of a portion of the control mechanism, looking in the direction of arrow 6 in Fig. 2.

Fig. 7 is a section taken in the plane indicated by line 7—7 in Fig. 6.

Although any suitable tractor, either wheel type or track type, may be employed for propelling the scraper, it is preferred to employ a special wheel type tractor particularly adapted for scraper operation, and having front, inflated rubber tired steering wheels 1 and rear, inflated rubber tired driving wheels 2. The main frame or body 3 of the tractor is a unit structure formed of an integral combination of engine 4, crankcase 5 and transmission case 6; such type of construction being well known in the tractor art. Operator's station 7 of such tractor is located and designed to facilitate driving of the tractor, as well as operation of scraper power control mechanism, and includes a comparatively narrow seat 8 located at the left side of the tractor between its ends and well forwardly of the rear end thereof. The seat faces forwardly and thus enables the operator to manipulate readily the tractor controls, including steering wheel 9, clutch pedal 10 and brake pedal 11, all located at the front of the operator's station. Also, such operator with slight movement of his right hand to the side may readily operate change speed gear shift control lever 12 and any one of cable control levers 13 for manipulation of adjustable scraper mechanism; such levers 13 being located at the right side of seat 8 but rearwardly displaced with respect thereto. This arrangement is much faster and easier for the operator for manipulation of the tractor and the scraper controls, compared to that now employed wherein the operator's seat extends the entire width of the tractor at the extreme rear end thereof, and the control handles for the scraper mechanism are directly in back of the operator's seat, because in the latter arrangement the operator must turn almost completely around for operation of the cable controls; and should it be necessary to propel simultaneously the tractor while adjusting scraper mechanism, this can be done only with difficulty.

The scraper frame and scraper mechanism of the scraper may be of any conventional construction; the scraper mechanism usually including a scraper bowl, an auxiliary front apron, means to raise or lower the bowl with respect to the ground, and means for discharging dirt from the bowl; the adjustments of which may be accomplished by cables 14, 16 and 17 connected to the scraper mechanism for controlling, respectively, operation of the front apron, the means to raise or lower the bowl, and the means for discharging the dirt. In the drawings, only the front part of scraper bowl apron 15 of the scraper mechanism is shown to shorten the views, and since the particular form of the scraper mechanism per se forms no part of the invention. The bowl is mounted in any suitable framework 18 which instead of being attachable to a tractor drawbar, is provided with a gooseneck extension 19 adapted for detachable universal connection at a point on top of tractor body 3. A tubular bracket 21 is formed at the lower end of extension 19, in which is rigidly secured by means of locking bolt 22 an upright tubular post 23. The lower end of the post 23 is formed with a hollow ball 24 which fits for universal movement in ball socket 26 formed on the top of the transmission case 6 of tractor body 3, adjacent the rear end thereof. Socket 26 includes detachably mounted cover plate 27 to enable the scraper to be attached or detached from the tractor. Thus, the scraper has a universal connection with the tractor, and this permits the scraper to travel relatively smoothly and evenly irrespective of the difference in the contour of the ground upon which the tractor and the scraper may travel.

Cable winding drums, mounted on the scraper, are provided for effecting winding and unwinding of the scraper mechanism operating cables 14, 16 and 17; such drums being drivable by the engine of the tractor through shafting to which substantially no stress can be transmitted, resulting from the propulsion of the tractor as relative movement occurs between the tractor and the scraper. Cable 16 is connected to winding drum 28 drivable in either direction by a self-locking worm and worm wheel drive 29 mounted in housing 31 on the scraper frame 18. Cable 14 is similarly drivable by winding drum 32, through a similar worm and worm wheel drive in housing 33; and cable 17 is connected to winding drum 34 which is drivable through worm and worm wheel driving mechanism in housing 36.

Power means is provided for transmitting a drive from the tractor to drive the cable winding drums 28, 32 and 34, comprising shaft 37 of the tractor which is driven from the tractor engine in any suitable way, and is connected to drive upright shaft 38 which extends into the hollow portion of ball 24 wherein it is universally connected by universal coupling 39, located substantially at the center of ball 24, to shaft 41 which extends upwardly and is journaled in tubular post 23. The upper end of shaft 41 extends into a clutch control box or housing 42 which has clutch mechanism (to be subsequently described) for enabling selective transmission of power in either one of opposite directions, as controlled by control levers 13, to any one of universally connected shafting 43, 44 and 46, in turn connected to the worm and worm wheel drives, which are connected to the cable winding drums 28, 32 and 34. From the preceding, it is seen that because the shafting 38, 41 for driving the cables has the universal connection 39 substantially at the center of ball and socket joint 24, 26, it will not become distorted as relative movement between the scraper and tractor occurs. Consequently, substantially no stress can be transmitted to the power shafting as a result of propulsion of the tractor; and since the entire control mechanism, particularly the cable winding drums 28, 32 and 34, is mounted on the scraper, substantially no pull resulting from propulsion of the tractor can be transmitted to the cables. This precludes premature breakdown of these parts, and easy operation thereof when the tractor is pulling, as well as when it is standing still.

Any suitable clutch mechanism may be employed for controlling the cable winding drums. For example, I may employ clutch mechanism of the type disclosed in my patent, No. 2,034,141, dated March 17, 1936. Such mechanism includes a plurality of reversibly operable clutch assemblies grouped within housing 42 mounted at the end and on the top of the scraper frame gooseneck extension 19. As can be seen from Figs. 4 and 5, a central one of such assemblies comprises oppositely positioned bevel gears 53 journaled about a shaft 54 journaled in housing 42; each of gears 53 having integral therewith a spur gear 55. Bevel gears 53 mesh with a bevel gear 56 secured to upright shaft 41, and are thus continuously rotated in opposite directions.

By means of a clutch element 64 splined for rotation with shaft 54 and axially shiftable to engage either gear 53 through clutch teeth 65, by proper manipulation of central control handle 13 connected to clutch control fork 67 through axially slidable shift rod 67', and which engages clutch element 64, shaft 54 may be selectively rotated in either one of opposite directions when so desired, to effect driving of shafting 46 connected thereto. The spur gears 55 mesh with pairs of similar spur gears 68, one pair of which is journaled about a shaft 69 at one side of shaft 54 and another pair of which is journaled about shaft 71 at the opposite side of shaft 54. Inasmuch as spur gears 55 are continuously rotated in opposite directions, the spur gears 68 about each of shafts 69 and 71 are also continuously driven in opposite directions. By means of a clutch element 72 about each of shafts 69 and 71, similar and controllable in the same manner as clutch element 64, each of shafts 69 and 71 can thus be rotated in either one of opposite directions, to effect driving of shafting 43 and 44, respectively, connected thereto.

For convenient manipulation by the operator, I preferably position control levers 13 with their operating ends arranged vertically so as to be able to swing laterally in horizontal planes. As can be seen from Figs. 1, 6 and 7, this is accomplished by making control levers 13 L-shaped, and pivoting them at their elbows, on vertical pivots 81, to brackets 82 secured to housing 42. The free ends of such levers are loosely connected at 83 to the axially slidable shift rods 67'.

I claim:

1. Earth moving apparatus comprising an earth moving vehicle having an extension adapted to project over the top of a tractor body and means at the end of said extension for universal connection to said top of said tractor body to enable said tractor to propel said vehicle while allowing relative movement between said vehicle and said tractor, a cable on said vehicle for operating mechanism thereon, a winding drum for said cable mounted on said vehicle, shafting mounted on said vehicle and drivable by said tractor for driving said drum, and means for precluding stress on said shafting as a result of propulsion of said tractor comprising a universal connection adapted for connection with driving means on said tractor substantially at the center of said first mentioned universal connection.

2. Earth moving apparatus comprising a tractor having a body, an earth moving vehicle having an extension projecting over the top of said tractor body, a hollow universal ball and socket connection between the top of said tractor body and the end of said extension to allow universal relative movement therebetween when the tractor propels said vehicle, earth handling mechanism on said vehicle, and means for driving said mechanism from said tractor including upright shafting extending through and having a universal connection within the hollow portion of said ball and socket connection substantially at the center thereof to preclude stress on said shafting as a result of propulsion of said tractor.

3. Earth moving apparatus comprising a tractor having a body, an earth moving vehicle having an extension projecting over the top of said tractor body, a hollow universal ball and socket connection between the top of said tractor body and the end of said extension to allow universal relative movement therebetween when the tractor propels said vehicle, earth handling mechanism on said vehicle, drivable means connected to said mechanism and mounted on said vehicle, and means for driving said drivable means from said tractor including upright shafting extending through and having a universal connection within the hollow portion of said ball and socket connection substantially at the center thereof to preclude stress on said shafting as a result of propulsion of said tractor.

4. Earth moving apparatus comprising a tractor having a body, an earth moving vehicle having an extension projecting over the top of said tractor body, a hollow universal ball and socket connection between the top of said tractor body and the ends of said extension to allow universal relative movement therebetween when the tractor propels said vehicle, earth handling mechanism on said vehicle, drivable means connected to said mechanism including cables and cable winding drums mounted on said vehicle, and means for driving said winding drums from said tractor including upright shafting extending through and having a universal connection within the hollow portion of said ball and socket connection substantially at the center thereof to preclude stress on said shafting as a result of propulsion of said tractor.

5. Earth moving apparatus comprising a tractor having a body, an earth moving vehicle having an extension projecting over the top of said tractor body, a hollow universal ball and socket connection between the top of said tractor body and the end of said extension to allow universal relative movement therebetween when the tractor propels said vehicle, earth handling mechanism on said vehicle, a plurality of cables for operating said mechanism, means for precluding stress on said cables as a result of propulsion of said tractor including a winding drum for each of said cables mounted on said vehicle, means mounted on said vehicle for driving said drums, means for driving said drum driving means from said tractor including upright shafting extending through and having a universal connection within the hollow portion of said ball and socket connection substantially at the center thereof to preclude stress on said shafting as a result of propulsion of said tractor, and control mechanism for said drum driving means including a plurality of control handles mounted on said vehicle.

6. Earth moving apparatus comprising a tractor having a body, a forwardly facing operator's station at one side of said tractor, an earth moving vehicle having an extension projecting over the top of said tractor body, a hollow universal ball and socket connection between the top of said tractor body and the end of said extension to allow universal relative movement therebetween when the tractor propels said vehicle, earth handling mechanism on said vehicle, a plurality of cables for operating said mechanism, means for precluding stress on said cables as a result of propulsion of said tractor including a winding drum for each of said cables mounted on said vehicle, means mounted on said vehicle for driving said drums, means for driving said drum driving means from said tractor including upright shafting extending through and having a universal connection within the hollow portion of said ball and socket connection substantially at the center thereof to preclude stress on said shafting as a result of propulsion of said tractor, and control mechanism for said drum driving means including a plurality of control handles mounted on said vehicle at a side of said operator's station between said station and the side of said tractor opposite thereto.

7. Earth moving apparatus comprising a tractor having a body, an earth moving vehicle having an extension projecting over the top of said tractor body, a hollow upright post secured to the end of said extension, a hollow universal ball and socket connection between the top of said tractor body and said post, earth handling mechanism on said vehicle, a plurality of cables for operating said mechanism, means for precluding stress on said cables as a result of propulsion of said tractor including a winding drum for each of said cables mounted on said vehicle, means mounted on said vehicle for driving said drums, means for driving said drum driving means from said tractor including upright shafting extending through said universal ball and socket connection and within the hollow portion of said post, said upright shafting having a universal connection within the hollow portion of said ball and socket connection substantially at the center thereof, and control mechanism for said drum driving means mounted on said post and including a plurality of control handles.

CARL A. GUSTAFSON.